(12) United States Patent
Kalbavi et al.

(10) Patent No.: US 11,472,035 B2
(45) Date of Patent: Oct. 18, 2022

(54) AUGMENTED REALITY VISUALIZATION FOR ROBOTIC PICKING SYSTEM

(71) Applicant: Fanuc America Corporation, Rochester Hills, MI (US)

(72) Inventors: Ganesh Kalbavi, Rochester, MI (US); Derek Jung, Clinton Township, MI (US); Leo Keselman, Ferndale, MI (US); Min-Ren Jean, Rochester Hills, MI (US); Kenneth W. Krause, Rochester Hills, MI (US); Jason Tsai, Bloomfield Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 599 days.

(21) Appl. No.: 16/453,838

(22) Filed: Jun. 26, 2019

(65) Prior Publication Data

US 2019/0389069 A1    Dec. 26, 2019

Related U.S. Application Data

(60) Provisional application No. 62/690,141, filed on Jun. 26, 2018.

(51) Int. Cl.
*B25J 9/16* (2006.01)
*G06F 3/01* (2006.01)
(Continued)

(52) U.S. Cl.
CPC .......... *B25J 9/1697* (2013.01); *B25J 19/021* (2013.01); *G02B 27/0172* (2013.01);
(Continued)

(58) Field of Classification Search
None
See application file for complete search history.

(56) References Cited

U.S. PATENT DOCUMENTS 9,802,317 B1    10/2017    Watts et al.
9,919,427 B1    3/2018     Guilbert
(Continued)

FOREIGN PATENT DOCUMENTS

EP         1769891 A2     4/2007

*Primary Examiner* — Jwalant Amin
(74) *Attorney, Agent, or Firm* — John A. Miller; Shumaker, Loop & Kendrick, LLP

(57) ABSTRACT

An augmented reality (AR) system for production-tuning of parameters for a visual tracking robotic picking system. The robotic picking system includes one or more robots configured to pick randomly-placed and randomly-oriented parts off a conveyor belt and place the parts in an available position, either on a second moving conveyor belt or on a stationary device such as a pallet. A visual tracking system identifies position and orientation of the parts on the feed conveyor. The AR system allows picking system tuning parameters including upstream, discard and downstream boundary locations to be visualized and controlled, real-time robot pick/place operations to be viewed with virtual boundaries, and system performance parameters such as part throughput rate and part allocation by robot to be viewed. The AR system also allows virtual parts to be used in simulations, either instead of or in addition to real parts.

23 Claims, 10 Drawing Sheets

(51) Int. Cl.
  *B25J 19/02* (2006.01)
  *G02B 27/01* (2006.01)
  *G06T 1/00* (2006.01)
  *G06V 20/20* (2022.01)

(52) U.S. Cl.
  CPC ............ G06F 3/011 (2013.01); G06T 1/0014 (2013.01); G06V 20/20 (2022.01)

(56) References Cited

U.S. PATENT DOCUMENTS

| | | | |
|---|---|---|---|
| 10,786,906 B2 * | 9/2020 | Yoshino | B25J 13/00 |
| 11,062,438 B2 * | 7/2021 | Sakai | G06V 10/75 |
| 2005/0075752 A1 * | 4/2005 | Ban | G05B 19/4182 |
| | | | 700/213 |
| 2007/0073444 A1 * | 3/2007 | Kobayashi | B25J 9/1671 |
| | | | 700/264 |
| 2012/0226382 A1 * | 9/2012 | Asada | B25J 9/1605 |
| | | | 901/47 |
| 2013/0116828 A1 * | 5/2013 | Krause | G05B 19/409 |
| | | | 700/264 |
| 2014/0244026 A1 * | 8/2014 | Neiser | B65G 1/1378 |
| | | | 700/216 |
| 2015/0127124 A1 * | 5/2015 | Kobayashi | B25J 9/1689 |
| | | | 700/83 |
| 2015/0134113 A1 | 5/2015 | Konietschke et al. | |
| 2015/0161808 A1 * | 6/2015 | Oya | B25J 9/1605 |
| | | | 345/633 |
| 2015/0290802 A1 | 10/2015 | Buehler et al. | |
| 2016/0151916 A1 * | 6/2016 | Kanno | B65G 47/90 |
| | | | 700/228 |
| 2016/0158937 A1 * | 6/2016 | Kamoi | B25J 9/1671 |
| | | | 700/259 |
| 2016/0207198 A1 * | 7/2016 | Willför | G05B 19/4061 |
| 2017/0235300 A1 * | 8/2017 | Maruno | G06T 7/74 |
| | | | 700/112 |
| 2018/0117766 A1 * | 5/2018 | Atohira | B25J 9/1671 |
| 2018/0215034 A1 * | 8/2018 | Jean | G05B 19/4182 |
| 2018/0243905 A1 * | 8/2018 | Atohira | B25J 9/0093 |
| 2018/0285543 A1 * | 10/2018 | Inoue | G06K 19/07773 |
| 2019/0147655 A1 * | 5/2019 | Galera | G05B 19/4061 |
| | | | 345/419 |

* cited by examiner ary visualization for robotic picking system is merely exemplary in nature, and is in no way intended to limit the disclosed devices and techniques or their applications or uses.

AUGMENTED REALITY VISUALIZATION FOR ROBOTIC PICKING SYSTEM

CROSS-REFERENCE TO RELATED APPLICATIONS

This application claims the benefit of the priority date of U.S. Provisional Patent Application Ser. No. 62/690,141, titled AUGMENTED REALITY VISUALIZATION FOR ROBOTIC PICKING SYSTEM, filed Jun. 26, 2018.

BACKGROUND

Field

This invention relates to the field of automated robot picking systems and, more particularly, to a system which uses an augmented reality display device to get a visual tracking system including one or more robots ready for production, where the system provides intuitive production-tuning of the robotic picking system parameters with overlays of diagnostic and production data—including boundaries—on the parts, conveyors, robots and sensors that comprise the system to cut down the long commissioning time.

Discussion of the Related Art

Industrial part picking and placement robots are very sophisticated machines which include vision systems enabling the robots to pick up randomly-placed and randomly-oriented parts from a conveyor and place the parts in a particular location and orientation for another conveyor or machine operation or in packaging. However, it is difficult and time consuming to get a multiple-robot visual tracking system ready for production.

The typical lead time to commission a visual tracking robotic picking system is about 1-1.5 months per robot in the system. It is also expensive in terms of parts and labor to tune the system to achieve the desired part throughput rate without errors. The main reason for the lengthy lead time is that when parts are moving on the conveyor, it is very hard to tune the system to get the desired picking rate with zero unpicked parts. Challenges are presented in validating vision finds, load-balancing between robots, motion tuning and diagnosing issues. Customers implementing these visual tracking robotic picking systems need ways to optimize part throughput while minimizing lead time to commission the systems.

In light of the circumstances described above, it is desired to provide an interactive augmented reality (AR) tool for production-tuning of the parameters for a visual tracking robotic picking system.

SUMMARY

In accordance with the teachings of the present disclosure, an augmented reality (AR) system for production-tuning of parameters for a visual tracking robotic picking system is disclosed. The robotic picking system includes one or more robots configured to pick randomly-placed and randomly-oriented parts off a conveyor belt and place the parts in an available position, either on a second moving conveyor belt or on a stationary device such as a pallet. A sensor such as a camera or a photo eye identifies position and orientation of the parts on the feed conveyor. The AR system allows picking system tuning parameters including upstream/discard/downstream boundary locations to be visualized and controlled, real-time robot pick/place operations to be viewed with virtual display of the boundaries, and system performance parameters such as part throughput rate and part allocation by robot to be viewed. The AR system also allows virtual parts to be used in simulations, either instead of or in addition to real parts.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a method and system for augmented reality configuration of a visual tracking robotic picking system is merely exemplary in nature, and is in no way intended to limit the disclosed devices and techniques or their applications or uses.

Robotic picking systems are known to be very valuable productivity tools in many industries. Robotic picking systems can pick up parts from a conveyor belt—such as parts which have just been molded or machined, or food products such as muffins or candy, and which have random placements and orientations on the conveyor—and place the parts in a particular orientation and location in a packaging container or on a second conveyor. Several robots may be placed in series along the conveyor belt in order to handle the required volume of parts.

While these systems are very productive, the typical lead time to commission a visual tracking robotic picking system is about 1-1.5 months per robot in the system. It is also expensive in terms of parts & labor to tune the system to achieve the desired part rate without errors. The main reason for the lengthy lead time is that when parts are moving on the conveyor, it is very hard to tune the system to get the desired picking rate with zero unpicked parts, especially when more than one robot is involved. Challenges include validating parts found by the vision system, load-balancing through placement of boundaries for each robot, motion tuning and diagnosing issues.

Recognizing the need described above, an improved system has been developed to provide fast and efficient production tuning of a visual tracking robotic picking system. The disclosed system uses an augmented reality (AR) application running on an AR device, which may be either a tablet computing device or an AR headset apparatus. The AR application communicates in real time with the robot controllers of the robotic picking system and provides visualization of real-time robot pick and place operations, including virtual display of zone boundaries that confine the picking area of the robot and performance parameters. Virtual parts may be used in addition to or instead of real parts. Details of the system are discussed below.

Figure 1:
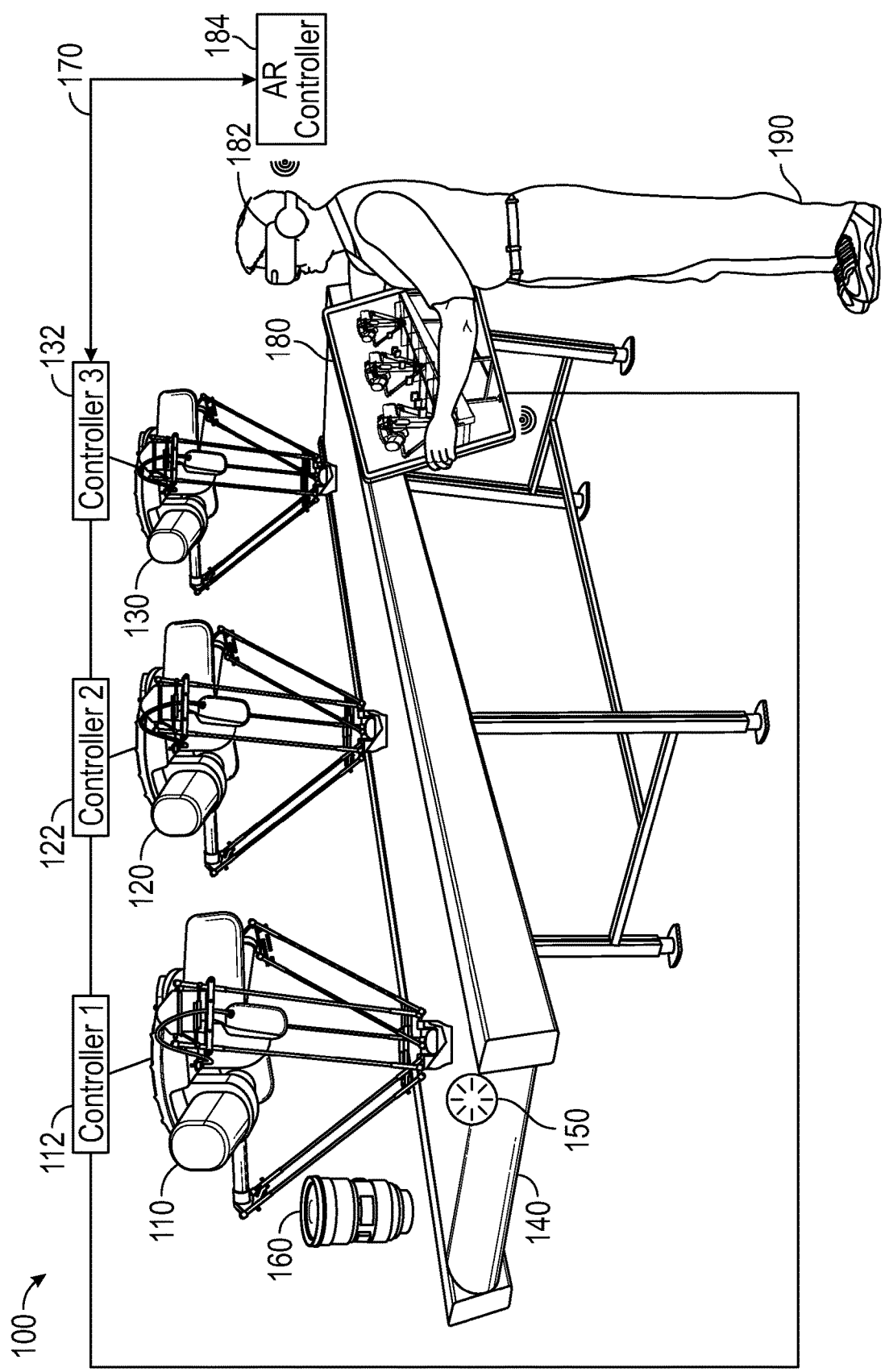
FIG. 1 is an illustration of a system for production-tuning of parameters for a visual tracking robotic picking system, according to an embodiment of the present disclosure.

FIG. 1 is an illustration of a system 100 for production-tuning of parameters for a visual tracking robotic picking system, according to an embodiment of the present disclosure. The system 100 includes a robot 110 controlled by a controller 112, a robot 120 controlled by a controller 122 and a robot 130 controlled by a controller 132. The robots 110, 120 and 130 of FIG. 1 are parallel-link robots specialized for pick-and-place applications; however, other types of robots may also be used in the system 100, as discussed later. The robots 110, 120 and 130 may communicate with their controllers via hard-wire cable connection, or wirelessly.

The robots 110, 120 and 130 are programmed for the task of picking parts from a conveyor 140 and placing the parts in a packaging container or on another conveyor. The parts and the placement location are not shown in FIG. 1 for the sake of simplicity. A pulse coder 150 tracks a position of the conveyor 140. The conveyor 140 only moves in one direction, and it is this longitudinal or axial position that is tracked by the pulse coder 150. A camera 160 takes pictures of incoming parts on the conveyor 140 and the picture images are used to determine the position and orientation of the incoming parts relative to the conveyor 140. The camera 160 could be replaced by a sensor such as a proximity sensing device which detects the presence of a part. However, because many applications involve randomly positioned and oriented incoming parts, a camera or other imaging sensor which can detect not only presence but also position and orientation is preferred.

The robot controllers 112, 122 and 132 communicate with the pulse coder 150 and the camera 160 via a network 170. As would be understood by one skilled in the art, the network 170 may be a local area network (LAN), either hard-wired or wireless, or some other type of network. The only requirement is that the controllers 112, 122 and 132 can communicate with each other and with the pulse coder 150 and the camera 160, so that the controllers 112, 122 and 132 know the location and orientation of incoming parts on the conveyor 140, and the axial position of the conveyor 140 at all times. This information is used to determine which robot picks and places which part.

The elements discussed above comprise a typical visual tracking robotic picking system as known in the art. In addition to these elements, the system 100 includes an AR device 180 or 182. The AR device 180 is a tablet device held by a user 190. The AR device 182 is an AR headset apparatus worn by the user 190. Either the AR device 180 or 182 may be used with the AR visualization application, as discussed below. The AR device 180 (tablet) may be a self-contained unit with processor and memory and capable of running the AR visualization application while communicating wirelessly with the other devices on the network 170. The AR device 182 (headset) may include a separate controller 184 with processor and memory and capable of running the AR visualization application while communicating with the other devices on the network 170, where the AR controller 184 is in hard-wired or wireless communication with the network 170, and the AR controller 184 is in wireless communication with the AR device 182 (headset). Throughout most of the following discussion, the AR device 180 is used as a proxy for either itself or the AR device 182 and the associated AR controller 184.

The AR visualization application running on the AR device 180 or 182 (in communication with the other elements of FIG. 1) enables performance tuning of a robotic picking system to achieve desired performance levels in much less time than with prior systems and methods. The AR visualization application provides the following features and functions;

Virtual AR display of boundaries (upstream, discard and downstream) for each robot—including boundaries on pick conveyor and place conveyor Manipulation of the boundary locations and communication to robot controller to determine impact on part pick performance Use of virtual parts—in place of or in addition to real physical parts—for faster and easier simulations of part pick performance Two-way communication between AR device and robot controllers; AR device provides boundary info to controllers, and controllers provide part allocation and pick/place info to AR device in real time AR display of diagnostic and performance data—such as missed parts, part allocation to each robot, overall part rate, etc.—for instant understanding of the impact of parameter changes Color coding and other part augmentation data to aid in visual recognition of part assignment by robot Easy registration/calibration of AR device position/orientation to the work cell coordinate frame using image recognition Continuous tracking of AR device position/orientation using visual and inertial odometry These and other features and functions will be explained in detail in the discussion below.

Figure 2:
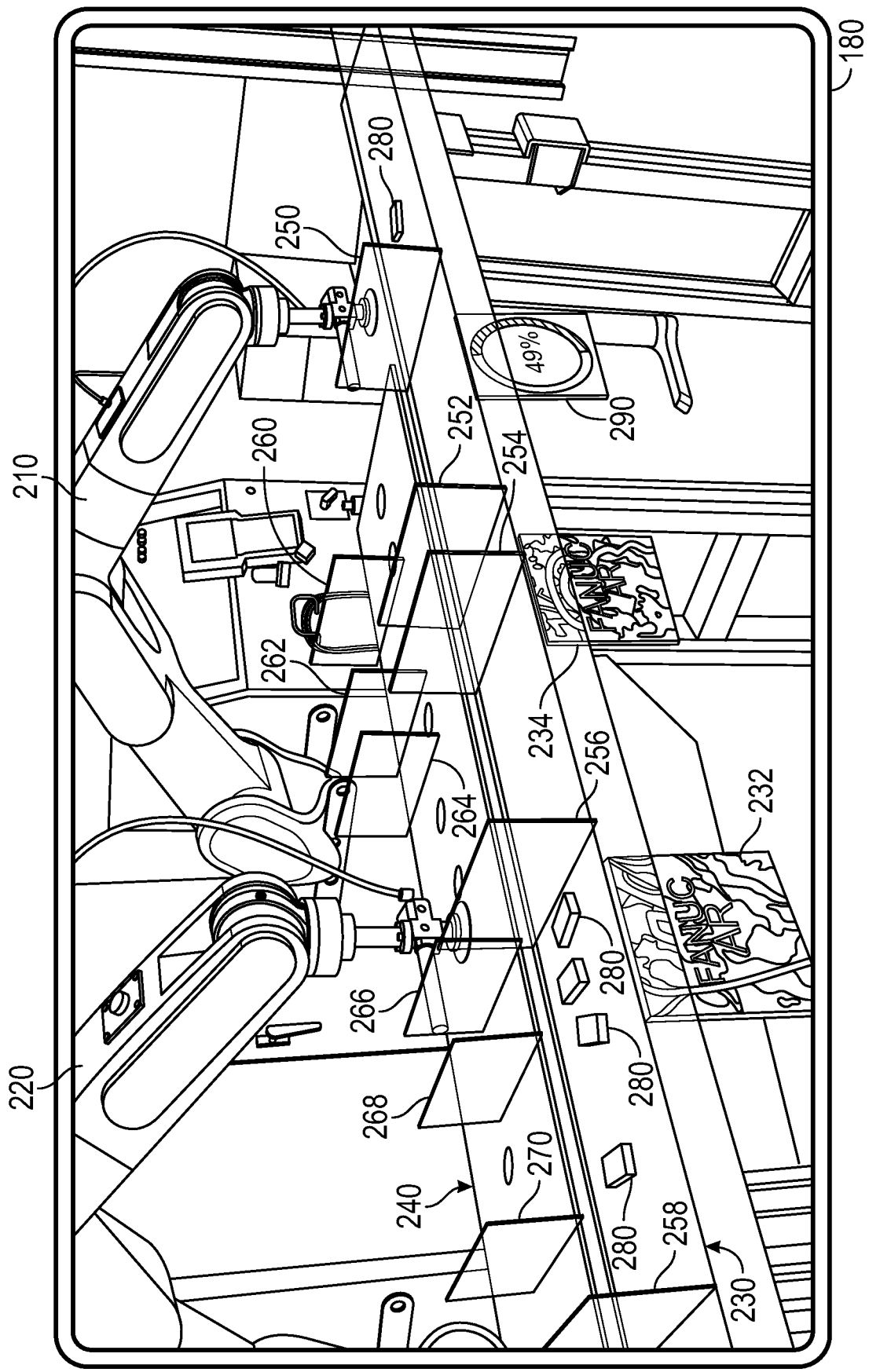
FIG. 2 is an illustration of an augmented reality (AR) display of a two-robot picking system, including virtual display of boundaries and parts, according to an embodiment of the present disclosure.

FIG. 2 is an illustration of an augmented reality (AR) display of a two-robot picking system, including virtual display of boundaries and parts, according to an embodiment of the present disclosure. FIG. 2 is an image from the AR visualization application, including both camera images of real items and computed graphics of virtual items, as displayed on the AR device 180 or 182. A robot 210 and a robot 220 are performing the task of picking parts from an inbound conveyor 230 and placing the parts on an outbound conveyor 240. The robots 210 and 220 are conventional multi-link articulated robots, as opposed to the parallel-link pick-and-place robots of FIG. 1. As mentioned earlier, either type of robot may be used with the AR visualization application.

The robots 210 and 220 each communicate with a dedicated robot controller, the robot controllers communicate with pulse coders (one for each conveyor) and a part imaging camera, and these elements (not shown) all communicate with the AR device 180, in the manner discussed previously with reference to FIG. 1.

The parts on the inbound conveyor 230 have random locations and orientations, as they may drop onto the inbound conveyor 230 after a prior manufacturing operation. The parts must be placed onto the outbound conveyor 240 in an available position (such as may be located every 200 mm) and at a uniform prescribed orientation. As viewed in FIG. 2, the direction of motion of both the inbound conveyor 230 and the outbound conveyor 240 is to the left.

The robots 210 and 220, and the conveyors 230 and 240, are real, physical items which are located in a work cell in a factory. They are visible in FIG. 2 as images from the camera of the AR device 180. Visual markers 232 and 234 are also real, physical items. These are graphical markers of a known size, shape and graphical design which are placed at known locations in the work cell. The visual markers 232 and 234 are shown in FIG. 2 as being affixed to the inbound conveyor 230, which is a convenient location. However, the visual markers 232 and 234 may be located anywhere within the work cell. The markers 232 and 234 will be used for spatial registration/calibration of the AR device 180 in a work cell coordinate frame, as discussed below with reference to FIG. 3.

FIG. 2 also shows boundaries which define zones of operation for the robots 210 and 220. The boundaries are represented as vertical planes, perpendicular to the direction of motion of the conveyors 230 and 240. An upstream boundary 250 defines the furthest upstream location that the robot 210 can pick a part from the inbound conveyor 230. A discard boundary 252 defines a location at which, if a part has not been allocated to (assigned to be picked by) the robot 210, then the robot 210 will no longer try to pick the part. In other words, the robot 210 ignores a part when it reaches the discard boundary 252 if the part is not already allocated. A downstream boundary 254 defines the furthest downstream location that the robot 210 can pick a part from the inbound conveyor 230. An upstream boundary 256 and a discard boundary 258 apply to the robot 220 in the same manner as like boundaries described above. A downstream boundary for the robot 220 is located to the left of the scene and is therefore not visible.

When a robotic picking system places parts onto stationary pallets or other packaging, the parts must be placed into available spots in the packaging (for example, a box may have an internal 10×10 grid, where a part needs to be placed into each cell). When a robotic picking system includes an outbound conveyor as in FIG. 2, the outbound conveyor 240 needs to have boundaries defined as well. An upstream boundary 260 defines the furthest upstream location that the robot 210 can place a part onto the outbound conveyor 240. A discard boundary 262 defines a location at which, if an available slot has not been allocated to (assigned to be used by) the robot 210, then the robot 210 will no longer try to place a part into that slot. A downstream boundary 264 defines the furthest downstream location that the robot 210 can place a part onto the outbound conveyor 240. An upstream boundary 266, a discard boundary 268 and a downstream boundary 270 apply to the robot 220 in the same manner as like boundaries described above.

Parts 280 are shown at various locations and orientations on the inbound conveyor 230. The parts 280 shown in FIG. 2 are virtual parts, displayed by the AR visualization application, and processed by the robot controllers just as if they had been detected by a camera, so that the robot controllers can pick and place the virtual parts during a live-action simulation. This will be discussed further below.

A performance indicator 290 is also shown in FIG. 2. The performance indicator 290 is one of many different types of performance indicators—which are virtual items computed and displayed by the AR visualization application.

The AR visualization application for robotic picking system running on the AR device 180 is in two-way real-time communication with the robot controllers. When the user modified a boundary location, the AR visualization application communicates the modified boundary location to the robot controllers, and the robot controllers immediately begin using the modified boundary location in their pick/place calculations. Thus, the effect of boundary changes can immediately be observed by the user. In turn, the robot controllers communicate every part allocation, pick and place operation to the AR device 180 for display in the AR visualization application. This is a high speed, real-time communication, and includes both real parts and virtual parts. The AR visualization application provides a real time virtual display of all part movements superimposed on camera images of the real scene (robots, conveyors and real parts). The AR visualization application also computes performance parameters based on the real-time part allocation and pick/place operation data received from the robot controllers.

The preceding discussion of FIG. 2 provides an overview of the AR visualization application for a robotic picking system and the items displayed therein. Further details are discussed below.

Figure 3:
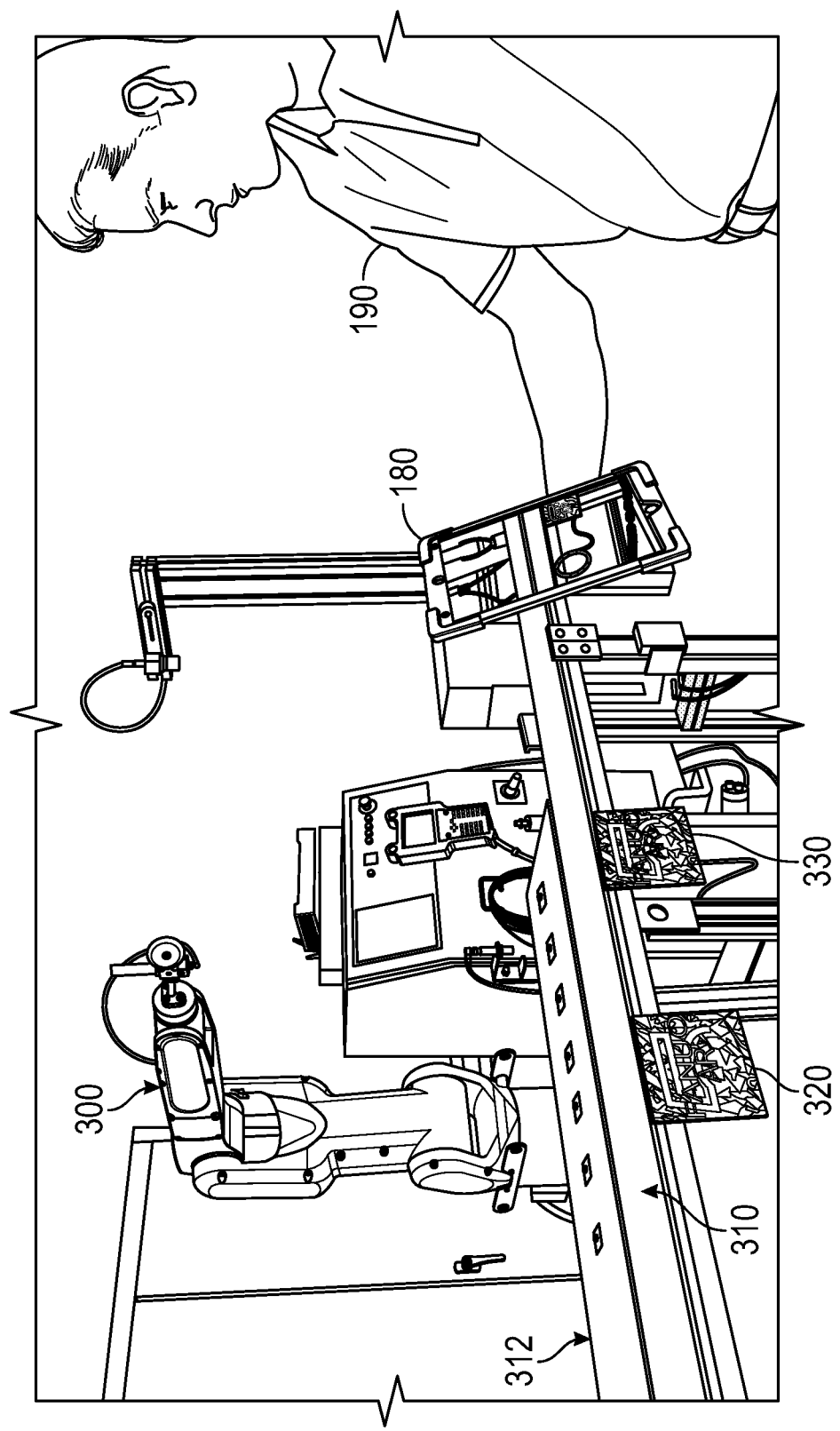
FIG. 3 is an illustration of a robotic picking system where an AR tablet device is calibrating its location and orientation relative to a work cell by imaging visual markers in the work cell, according to an embodiment of the present disclosure.

FIG. 3 is an illustration of a robotic picking system where an AR tablet device is calibrating its location and orientation relative to a work cell by imaging visual markers in the work cell, according to an embodiment of the present disclosure. A robot 300 is assigned the task of picking parts from a conveyor 310 and placing the parts on a conveyor 312. The AR visualization application for robotic picking systems is to be used on the AR device 180 by the user 190, as discussed earlier. In order for any AR system to properly display virtual items (such as boundaries and virtual parts) overlaid on camera images of real-world parts, the AR device must know its position and orientation relative to the work cell at all times. For this purpose, a work cell coordinate frame is defined having a known origin and orientation within the work cell, and the position and orientation of the AR device 180 are determined relative to the fixed work cell coordinate frame. In addition, various other coordinate frames are defined—such as a coordinate frame for each robot, coordinate frames for the conveyors, and even coordinate frames for each part.

In order to initially determine the position and orientation of the AR device 180 relative to the fixed work cell coordinate frame, camera images of visual markers may be analyzed. In FIG. 3, visual markers 320 and 330 are fixed to the conveyor 310. The size, shape and location of the visual markers 320 and 330 relative to the work cell coordinate frame are known to the AR visualization application. One technique for initially determining the position and orientation of the AR device 180 is to find any two visual markers (the markers 320 and 330 in this case) in the display of the AR device 180; by analyzing the size, shape and position of the markers 320 and 330 in the camera images, the AR device 180 can calculate its position and orientation in space relative to the markers 320 and 330, and therefore relative to the work cell coordinate frame.

Figure 4:
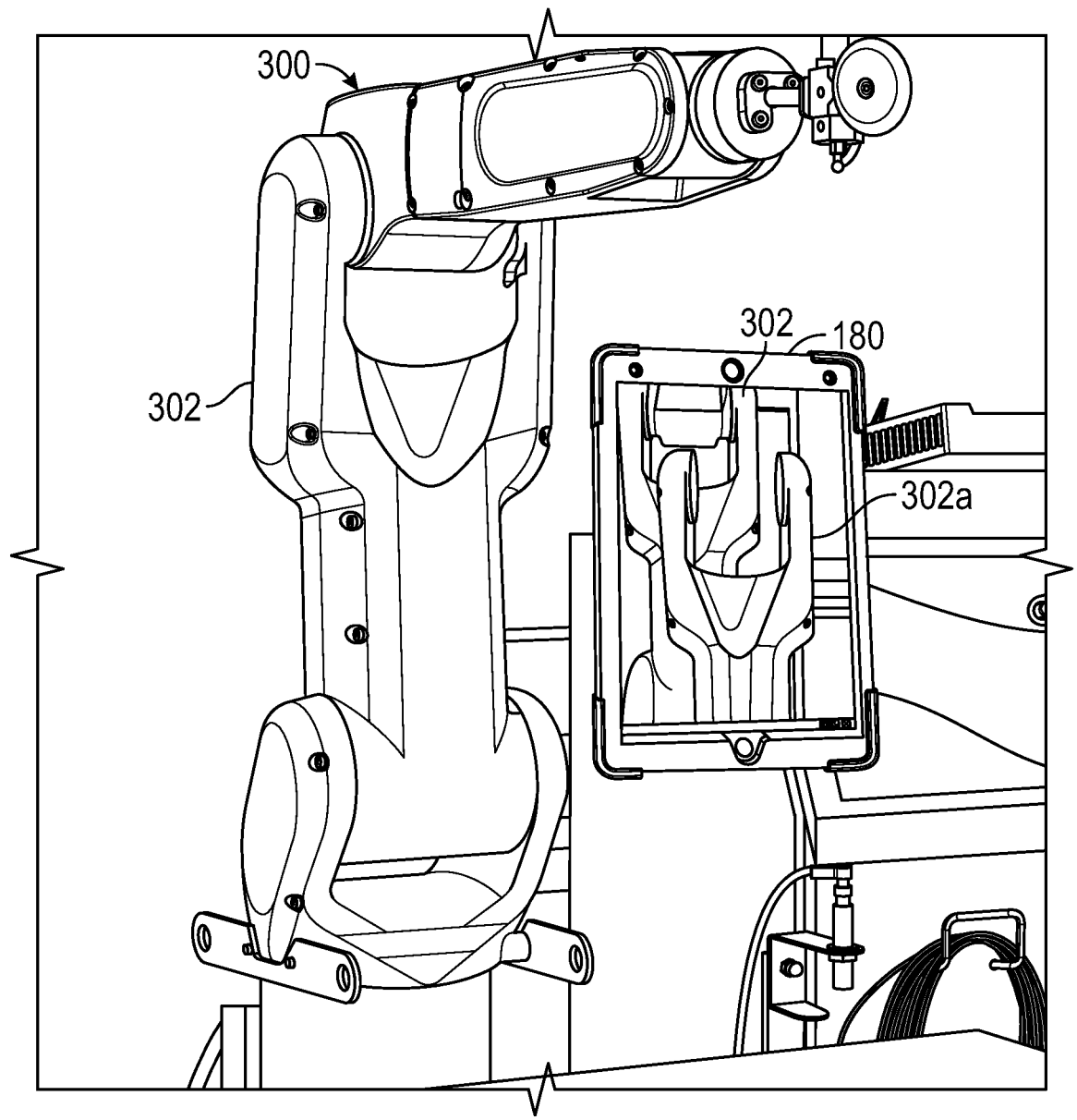
FIG. 4 is an illustration of the system of FIG. 3 where the AR tablet device is calibrating its location and orientation relative to the work cell by imaging a recognizable part of a robot, according to an embodiment of the present disclosure.

FIG. 4 is an illustration of the system of FIG. 3 where the AR tablet device 180 is calibrating its location and orientation relative to the work cell by imaging a recognizable part of a robot, according to an embodiment of the present disclosure. Another technique for determining the position and orientation of the AR device 180 is to find a recognizable part, such as a part of the robot 300, in the display of the AR device 180. In FIG. 4, a "fork" part of a robot arm 302 is found in the display of the AR device 180. A virtual image 302a is displayed by the AR visualization application, indicating to the user 190 that the part (the robot arm 302) has been identified. Because the robot controller knows the configuration of the robot 300 at all times, the position and orientation of the robot arm 302 are known to the controller and to the AR device 180. From this information, the AR device 180 can calculate its position and orientation in space relative to the work cell coordinate frame.

Once initially established, the position and orientation of the AR device 180 may be continuously tracked by a combination of visual and/or inertial odometry techniques, as would be understood by one skilled in AR technology. The AR device 180 (or 182) contains inertial sensors including one or more gyroscopes and one or more accelerometers, where the inertial sensors provide signals to the processor in the AR device enabling continuous computation of changes in position and orientation of the AR device by inertial odometry. Continuous analysis of images of scenes in the work cell by the AR device 180 (or 182) also provide visual odometry information which may be used to refine and calibrate the position data from inertial odometry.

Figure 5:
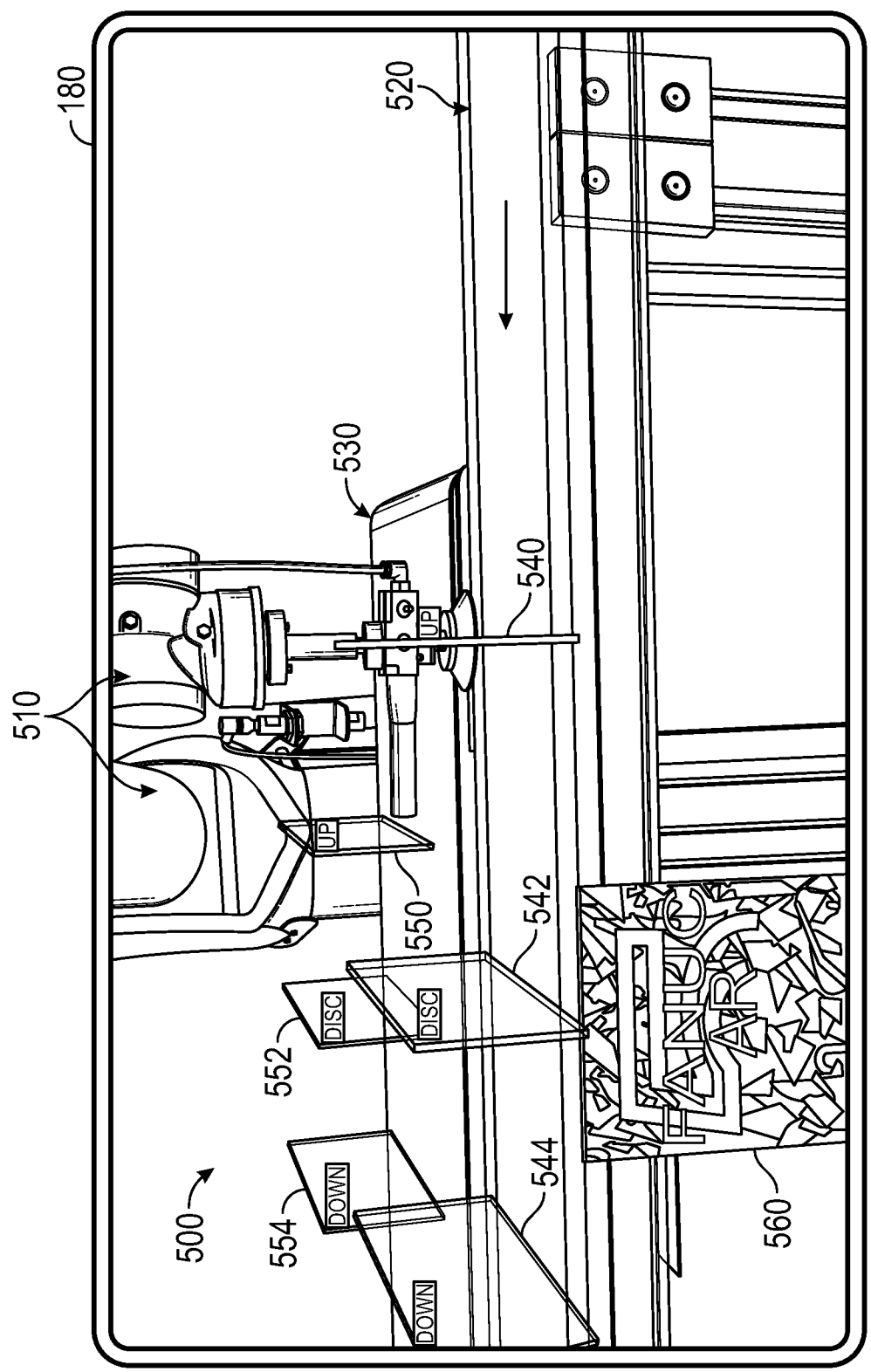
FIG. 5 is an illustration of an AR display of a robotic picking system, including virtual display of boundaries on both inbound and outbound conveyors, according to an embodiment of the present disclosure.

FIG. 5 is an illustration of an AR display of a robotic picking system 500, including virtual display of boundaries on both inbound and outbound conveyors, according to an embodiment of the present disclosure. FIG. 5 is an image from the AR visualization application, including both camera images of real items and computed graphics of virtual items, as displayed on the AR device 180. A robot 510 is assigned the task of picking parts from an inbound conveyor 520, which has a direction of motion indicated by the arrow, and placing the parts on a conveyor 530 which is moving in the same direction.

An upstream boundary 540 (in edge view), a discard boundary 542 and a downstream boundary 544 are defined for the picking of parts by the robot 510 from the inbound conveyor 520. An upstream boundary 550, a discard boundary 552 and a downstream boundary 554 are also defined for the placement of parts by the robot 510 onto the outbound conveyor 530. A visual marker 560 is also shown in FIG. 5, where the visual marker 560 is used for calibration of the position and orientation of the AR device 180 as discussed previously.

FIG. 5 does not show any parts—real or virtual. Instead, FIG. 5 illustrates the robotic picking system 500 as it would be viewed in the AR visualization application before simulations and performance tuning begin.

Figure 6:
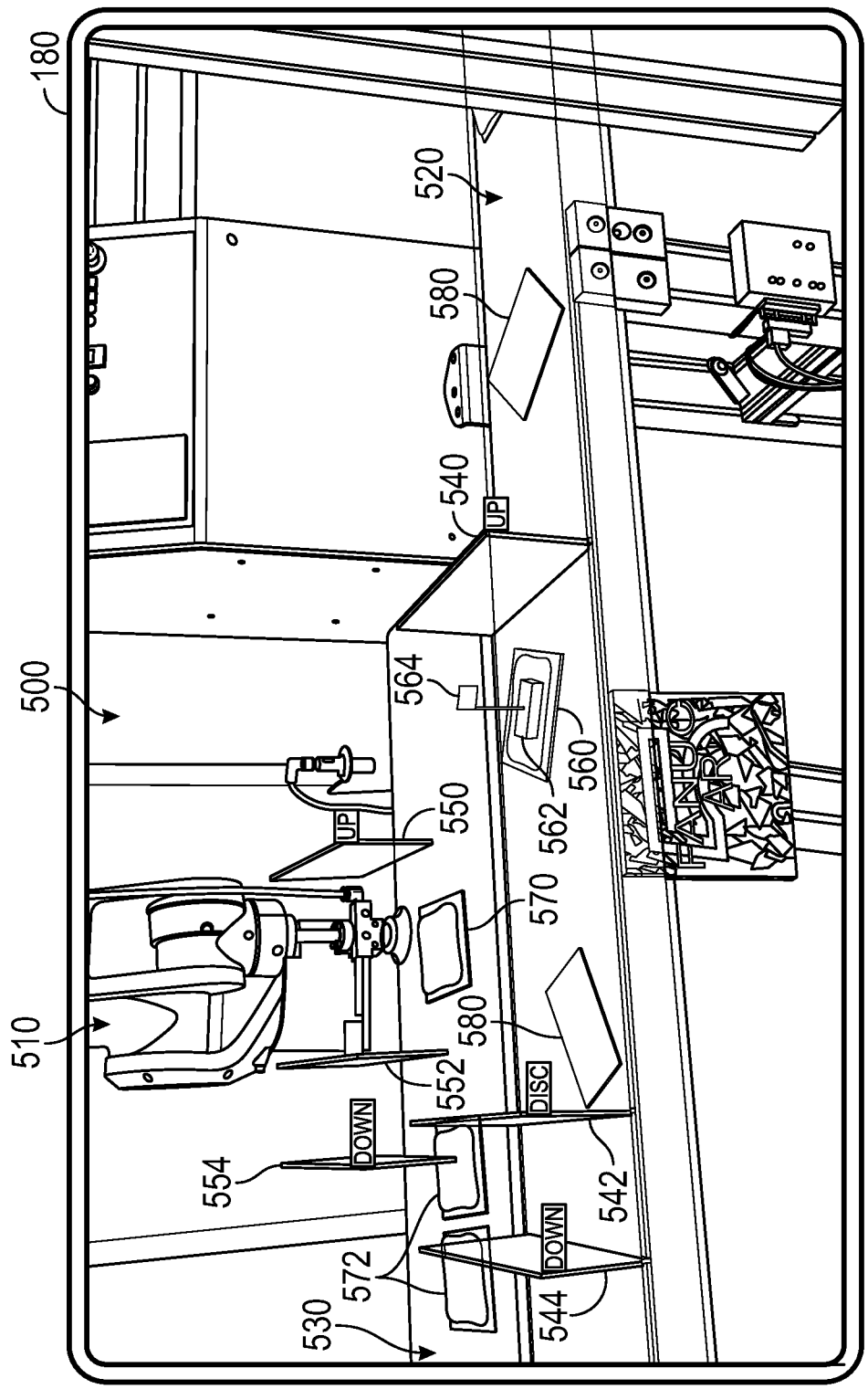
FIG. 6 is an illustration of an AR display of the robotic picking system of FIG. 5, including real physical parts being picked and placed by a robot, according to an embodiment of the present disclosure.

FIG. 6 is an illustration of an AR display of the robotic picking system 500 of FIG. 5, including real physical parts being picked and placed by a robot, according to an embodiment of the present disclosure. FIG. 6 is an image from the AR visualization application, including both camera images of real items and computed graphics of virtual items, as displayed on the AR device 180. Also shown in FIG. 6 is an overlay of a virtual part block on the real part that confirms that the real part was found by the vision system.

The boundaries 540, 542 and 544 for the inbound conveyor 520, and the boundaries 550, 552 and 554 for the outbound conveyor 530, shown previously in FIG. 5, are also visible in FIG. 6. These boundaries constrain the behavior of the robot 510 as discussed earlier. In FIG. 6, real parts are being fed in on the inbound conveyor 520. To be clear, when the user is using the AR visualization application for robotic picking systems to tune the configuration parameters of the system 500, the robot 510 is actually operating—picking the real parts from the inbound conveyor 520 and placing them on the outbound conveyor 530. The parts, the conveyors 520 and 530 and the robot 510 are all viewed as camera images on the AR device 180.

A real part 560 is moving on the inbound conveyor 530. The part 560 has passed the upstream boundary 540 and is therefore available to be picked by the robot 510. The AR visualization application indicates that the part 560 has been recognized by the vision system (such as the camera 160 of FIG. 1) by overlaying the real part 560 with a virtual part block 562. The virtual part block 562 may be color coded to indicate its status—such as which robot it is allocated to (if more than one robot), or whether it is unallocated. The virtual part block 562 also includes an information flag 564, which can include other information (part or model number, for example) encoded in color and/or text symbols.

A real part 570 has just been placed on the outbound conveyor 530 by the robot 510. The virtual part block and the information flag associated with the part 570 are not shown in FIG. 6 for the sake of clarity, but virtual part blocks and the information flags associated with parts may optionally follow the parts onto the outbound conveyor 530, where the encoded information may change to reflect the change of status (already picked and placed; encoded information shows by which robot). Real parts 572 are located further downstream on the outbound conveyor 530, these parts 572 having been picked and placed by the robot 510 moments earlier.

Other parts 580 are present on the inbound conveyor 530. The parts 580 are not valid parts for the robotic picking system 500, being upside down, or a wrong type of part, or otherwise invalid. Because the parts 580 are invalid, the vision system does not queue them up for picking and placing by the robot 510.

Figure 7:
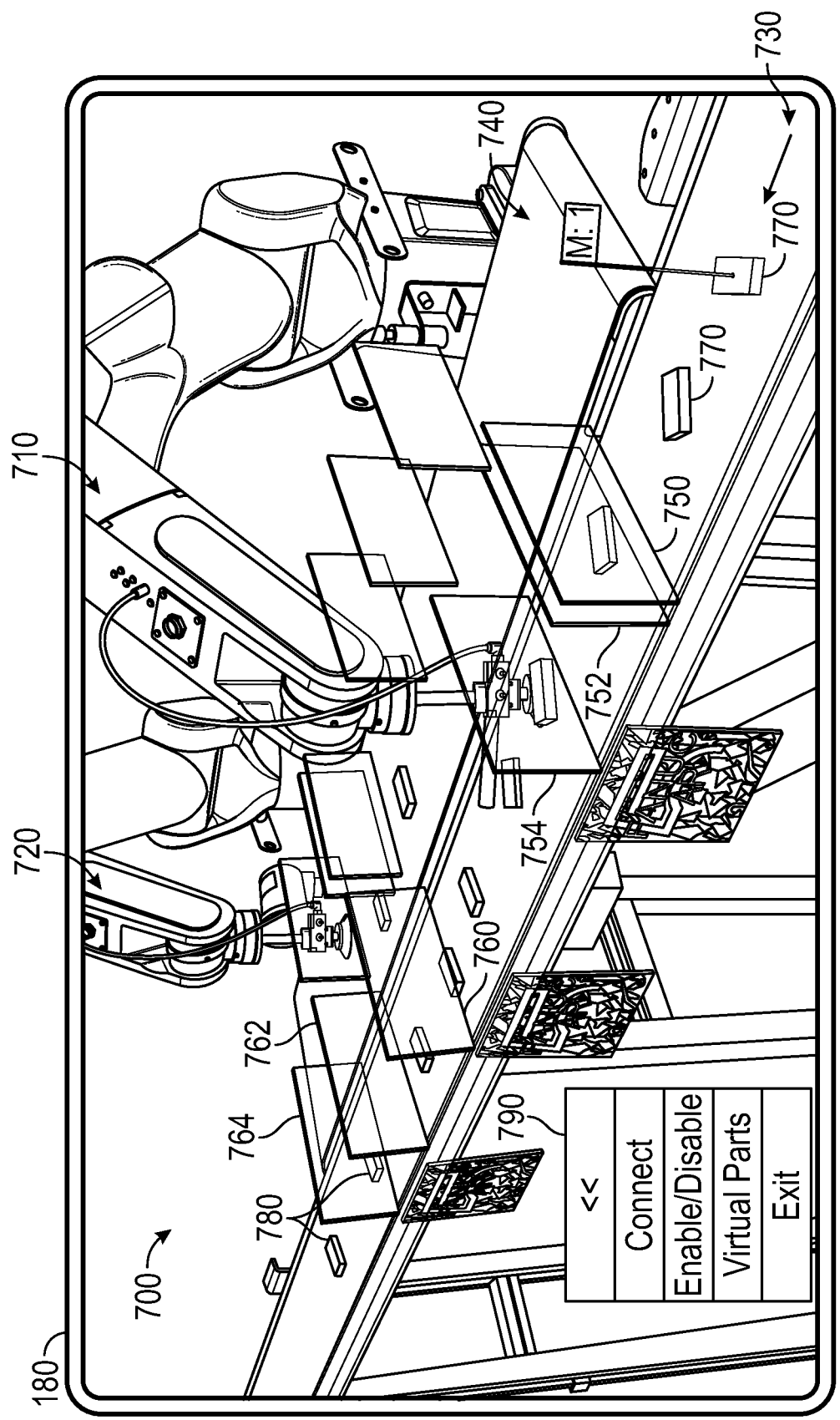
FIG. 7 is an illustration of an AR display of a robotic picking system, including virtual parts being picked and placed by robots, with sub-optimal boundary placements resulting in missed parts, according to an embodiment of the present disclosure.

FIG. 7 is an illustration of an AR display of a robotic picking system 700, including virtual parts being picked and placed by robots, with sub-optimal boundary placements resulting in missed parts, according to an embodiment of the present disclosure. FIG. 7 is an image from the AR visualization application, including both camera images of real items and computed graphics of virtual items, as displayed on the AR device 180.

A robot 710 and a robot 720 are both picking parts from an inbound conveyor 730 and placing them on an outbound conveyor 740. An upstream boundary 750, a discard boundary 752 and a downstream boundary 754 are defined for the picking of parts by the robot 710 from the inbound conveyor 730. An upstream boundary 760, a discard boundary 762 and a downstream boundary 764 are defined for the picking of parts by the robot 720 from the inbound conveyor 730. Boundaries for the placement of parts on the outbound conveyor 740 are shown in FIG. 7 but not numbered, as they are not relevant to the discussion of the figure.

In the robotic picking system 700 of FIG. 7, no real parts are being fed on the inbound conveyor 730. Instead, virtual parts such as the parts 770 are generated by the robot controllers based on parameters provided by the AR visualization application. The virtual parts 770 are created at a user-defined part feed rate, and having locations and orientations which are randomly assigned or assigned based on a defined statistical distribution. The virtual parts 770 may be used in addition to real parts, or instead of real parts, for robotic picking system simulation and production-tuning of parameters.

In FIG. 7, the picking boundary locations have not yet been optimized. It can be seen that the discard boundary 752 is very close to the upstream boundary 750. This boundary arrangement is not conducive to efficiency of the robot 710 which, as a result, does not pick and place very many parts. The net effect on the system 700 is that a lot of the parts 770 are still present on the inbound conveyor 730 downstream of the robot 710, and some parts 780 on the inbound conveyor 730 have passed the downstream boundary 764 of the robot 720. These parts 780 are missed parts, now having no chance of being picked. Missed parts are undesirable, and thus the parameter tuning of the robotic picking system 700 needs to be improved.

A menu window 790 is also shown in the display of the AR device 180 in FIG. 7. The menu window 790 is a virtual display which changes based on the situation, offering different options for commands and control of the AR visualization application for robotic picking systems, as would be understood by one skilled in the art.

Figure 8:
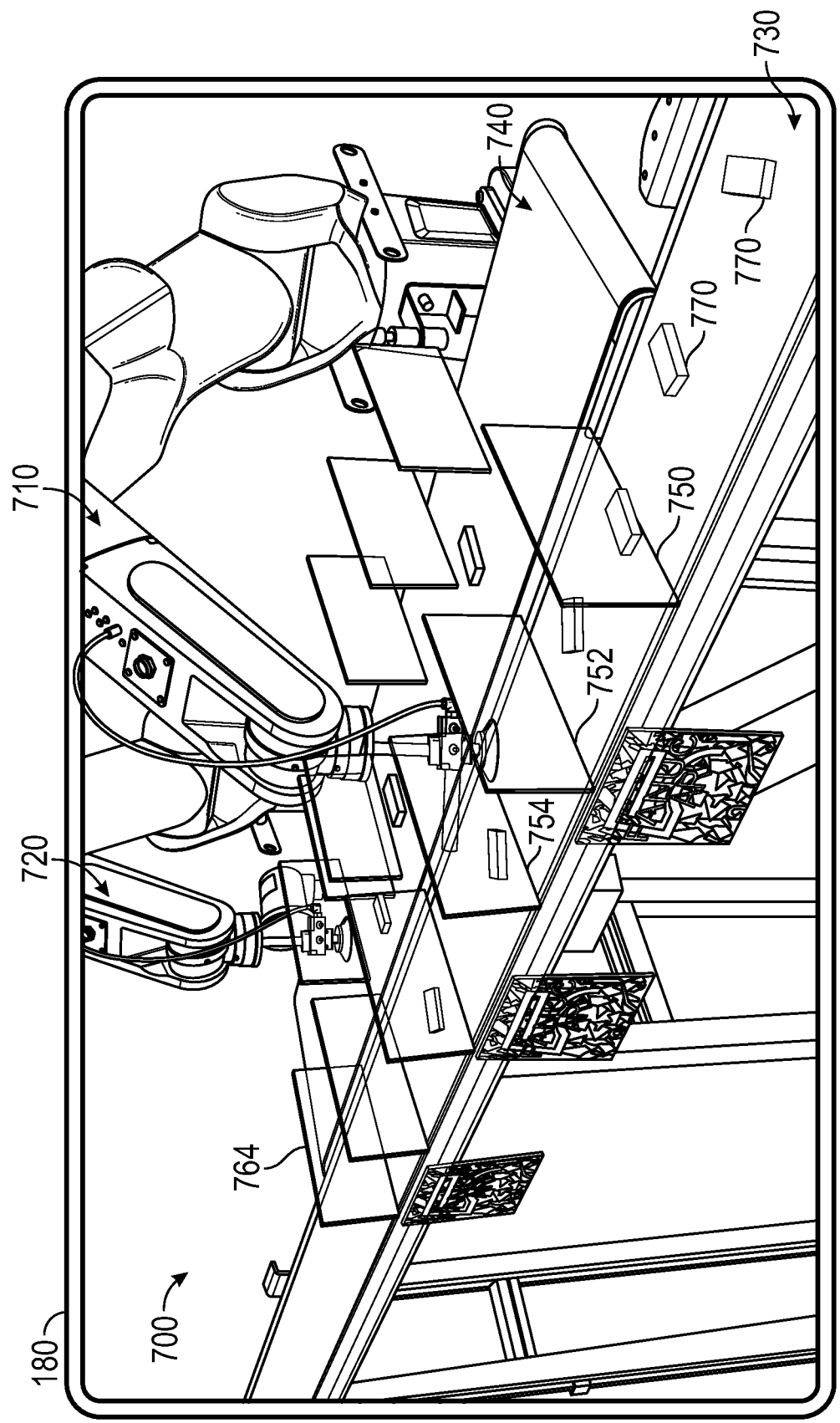
FIG. 8 is an illustration of an AR display of the robotic picking system of FIG. 7, including virtual parts being picked and placed by robots, with improved boundary placements achieved by the AR device eliminating the missed parts, according to an embodiment of the present disclosure.

FIG. 8 is an illustration of an AR display of the robotic picking system 700 of FIG. 7, including virtual parts being picked and placed by robots, with improved boundary placements eliminating the missed parts, according to an embodiment of the present disclosure. FIG. 8 is an image from the AR visualization application, including both camera images of real items and computed graphics of virtual items, as displayed on the AR device 180.

In FIG. 8, the picking boundary locations have been fine-tuned through the interactive simulation and visualization features offered by the AR visualization application. It can be seen that the discard boundary 752 is now further from the upstream boundary 750 than in FIG. 7. This boundary arrangement improves the efficiency of the robot 710 which, as a result, picks and places about half of the incoming parts 770. The net effect on the system 700 is that far fewer parts 770 are still present on the inbound conveyor 730 downstream of the robot 710, and no parts 780 have passed the downstream boundary 764 of the robot 720. That is, there are no missed parts with the boundary locations of FIG. 8.

The preceding figures and discussion provide ample illustration of how the locations of the three boundaries for each robot are critical to the performance of the robotic picking system. The AR visualization application for robotic picking systems enables a user to move the boundaries to improve system performance. Because the boundaries only have locational meaning in one direction (the axial or longitudinal direction of the conveyor), that is the only direction that boundaries can be moved. In one embodiment, AR gestures (by the user's hand) allow for selecting a boundary, moving the boundary either upstream or downstream, and accepting the new location. In another embodiment, either gestures or menu commands (virtually displayed) are used to select a boundary, and then menu commands are used to move the boundary (for example, upstream 50 mm). Other boundary editing paradigms may be offered as well.

As far as initial boundary placement is concerned (before the editing discussed above), this initial boundary placement may be handled in at least two different ways. In one embodiment, another robotic picking system configuration system may be used to initially create and locate the three boundaries for each robot. Such configuration systems exist in the industry (such as systems where the user operates a teach pendant in communication with the robot controller), and although the existing systems don't offer the interactive visualization and performance tuning of the present AR visualization application, the existing systems do allow boundary creation. Thus, boundary initial positions could be imported from an existing system, or from the robot controllers themselves, into the AR visualization application.

In another embodiment, the AR visualization application can have its own boundary creation capability—where the boundaries could initially be created in some default locations (for example, an upstream boundary located a default distance upstream of the associated robot, a discard boundary located directly adjacent the associated robot and a downstream boundary located a default distance downstream of the associated robot), or the AR visualization application could prompt the user to position each boundary when it is initially created. Regardless of how the boundaries are initially created or imported in the AR visualization application, the user can then use the boundary viewing and moving features of the application to fine tune performance, as discussed above.

The boundary locations which are fine-tuned through the visualization and modification features of the AR visualization application must be transferred back to the robot controllers. Each boundary position change is communicated to the robot controllers, which use the new location on their pick/place calculations. The user can then observe the effect of the boundary change in the performance of the robotic picking system. When the user is satisfied that the robotic picking system has been tuned to achieve the desired performance, the user simply selects a menu command to confirm and commit the boundary locations back to the robot controllers, which are in communication with the AR device as discussed earlier. Production operations of the robotic picking system may then proceed, using the boundaries as modified in the AR visualization application, but without the further involvement of the AR visualization application or the AR device.

Other features of the AR visualization application for robotic picking systems are also provided, and are discussed here. Display of the various virtual features and menus may be enabled or disabled by the user as desired. For example, boundaries on the outbound conveyor may be disabled while the user is optimizing the locations of the boundaries on the inbound conveyor, and vice versa. Likewise, menus and performance parameter displays may be turned on (made visible) or off, and their locations (either on the screen of a tablet-type AR device, or location in space when using an AR headset) may be changed as desired.

Recording of the AR display and camera images of the real world work cell objects is also offered. Recording a session allows for convenient communication of robotic picking system performance to other parties who were not present at the session—for sharing with customers and suppliers, for troubleshooting by other engineers and technicians, etc.

User inputs and interactions with the AR visualization application, and/or with the other (non-AR) boundary definition system, are provided in a convenient and straightforward fashion. For example, once the AR visualization application is started, the user can select one or more robots to connect (via their controller) to the AR visualization application, select work cell objects such as conveyors, and select boundaries to modify as discussed above.

Virtual part generation may be started and stopped by the user as needed. In one embodiment, the robot controllers actually generate the virtual parts, and the generation by the robot controllers is based on control parameters including the types of parts, the distribution of their placement and orientation on the inbound conveyor, and the rate of part feed. These parameters relative to the virtual parts are controllable via menu commands in the AR visualization application, and communicated to the robot controllers. Display parameters (color codes and information flags) for virtual parts, and for display images tagged onto real parts, are also controllable by the user. Information flags and color coding may be defined for many different attributes of the real or virtual parts. For example, all incoming parts may be displayed in one color, and the color then changed when each part is allocated to a robot (different colors for different robots). Color coding and information flags can further identify when a part is actually picked by a particular robot, when a part is placed by a particular robot, missed parts, dropped parts (for real parts), etc.

Display of the virtual elements (boundaries, virtual parts, part information flags, menu displays and performance parameter displays, etc.) may be controlled for optimal viewing by the user. This includes setting a transparency percentage for the boundaries, setting the color coding for part information as discussed above, setting font size and color for any text, defining size and color of any coordinate frame triads which are displayed, and defining a location (on the tablet screen or in AR space) for text and menu displays.

Figure 9:
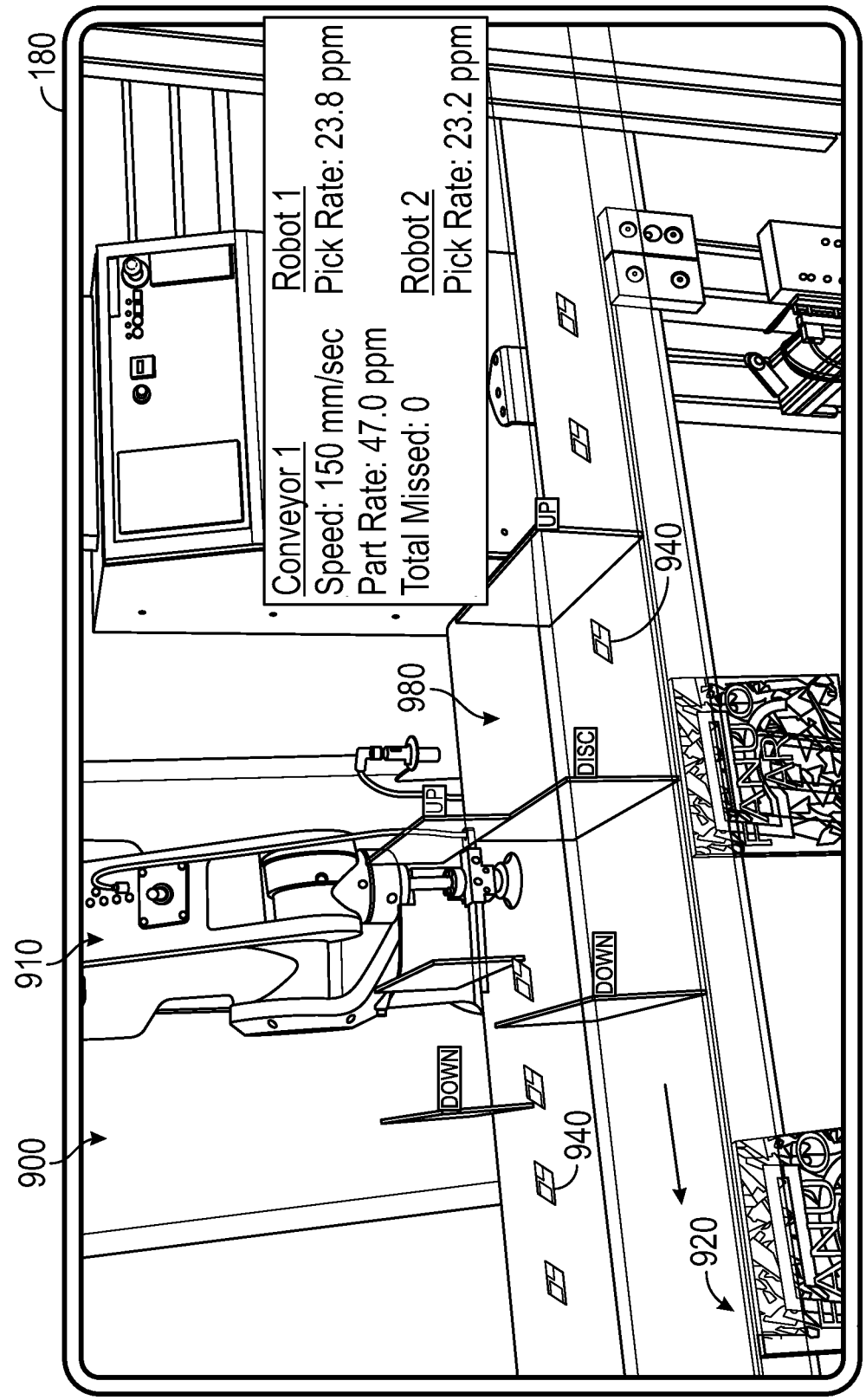
FIG. 9 is an illustration of an AR display of a robotic picking system, including AR display of boundaries and performance parameters, according to an embodiment of the present disclosure.

FIG. 9 is an illustration of an AR display of a robotic picking system 900, including AR display of boundaries and performance parameters, according to an embodiment of the present disclosure. FIG. 9 is an image from the AR visualization application, including both camera images of real items and computed graphics of virtual items, as displayed on the AR device 180.

A robot 910 and a second robot (not shown) are assigned the task of picking parts 940 from an inbound conveyor 920 and placing the parts 940 on an outbound conveyor 930, in the manner discussed previously. In addition to the display of virtual boundaries (upstream, discard and downstream), FIG. 9 shows a display of performance parameters. The display of the performance parameters may be arranged and formatted in any suitable fashion, as known to those skilled in augmented reality systems. For example, the performance parameter display may be placed at a certain location in the AR viewing area, or the performance parameter display may be "parked in space" in the 3D volume of the work cell.

In the example of FIG. 9, several performance parameters are displayed which characterize the efficiency and effectiveness of the robotic picking system 900. The parameters include, for the inbound conveyor 920, the conveyor speed, the rate of part introduction on the conveyor, and the total number of missed parts during a simulation time period. The parameters also include the part pick rate for each of the robots. These parameters give the user or operator the information needed to determine whether the robotic picking system 900 is meeting performance requirements—such as having zero missed parts for a required part rate, and having approximately equal pick rates between the two robots. The AR visualization application for robotic picking systems also gives the user the tools needed to adjust the system to improve the performance parameters—particularly the ability to adjust the locations of the three boundaries for each of the robots.

Other performance parameters are also available for display to the user in the AR visualization application. The display for performance parameters, menus and other items is configurable by the user, and may be turned on or off in the display at any time. In one embodiment, performance statistics for a particular conveyor or robot may be displayed by "tapping on" the conveyor or robot by the user in AR space. In another embodiment, simply viewing a robot in the AR device causes the status and statistics of the robot to be displayed. This could include an indication of whether the robot is faulted, the reason if the robot is not faulted by not moving, and pick/place performance statistics for the robot. Performance data for a particular conveyor may similarly be displayed by viewing the conveyor in the AR display. Many other display controls are offered—including turning the display of all performance parameters on, turning all displays off, etc.

Slightly different user experiences may be provided depending on whether the AR device is a tablet computing device (where performance statistics may be displayed at a particular location on the screen) or an AR headset apparatus (where performance statistics may be displayed as a virtual screen "parked in space" at a particular location in the work cell for the user to view and interact with). Menu displays and interactions are handled similarly. Throughout this disclosure, reference is frequently made to the tablet AR device 180. It is to be understood that the same concept applies to the headset AR device 182.

In earlier discussion of FIGS. 3 and 4, registration or calibration of the position/orientation of the AR device to a work cell coordinate frame (a fixed "global" coordinate frame) was described. Mathematical transformation between various other coordinate frames and the work cell coordinate frame are handled in the AR visualization application in a manner that would be understood by those skilled in the art. A conveyor tracking frame may be established which has a position and velocity, relative to the fixed work cell coordinate frame, determined by data signals from the pulse coder 150 shown in FIG. 1. Parts identified by the camera 160 are assigned an individual part tracking frame position and orientation, and the part tracking frame then moves with the conveyor tracking frame while the part is on the inbound conveyor (or an outbound conveyor). The part tracking frame likewise moves with the outbound conveyor tracking frame after the part has been picked and placed by the robot. Virtual parts, and virtual markers for real parts, also have part tracking frames which move with the respective conveyors and tool center points.

Each robot in a robotic picking system also has associated coordinate frames—including a fixed coordinate frame at a base location of the robot, moving coordinate frames at one or more joint locations on the robot, and a moving coordinate frame at the tool center position (the center of the suction cup which picks up a part, for example). When a robot deploys its suction cup or other tool to pick up a part, the part tracking frame then moves with the tool center position tracking frame until the part is placed on the outbound conveyor or in a shipping container.

The AR device 180 also has its own coordinate frame. Techniques for establishing and continuously updating the AR device coordinate frame relative to the work cell coordinate frame were discussed earlier. With the appropriate definition and continuous tracking of all of the coordinate frames relative to the work cell coordinate frame, the computation of the real-time movement of all parts, robot tools and the AR device is possible. This enables the robot controllers to calculate their picking strategies and movements, and enables the AR device to properly display all of the virtual items in proper size and orientation relative to the camera images of the real-world items.

Coordinate frame display is controllable by the user. For example, the user may turn on the display of some coordinate frames (such as part tracking frames and tool center position tracking frames), and turn off others (such as conveyor-based or work cell coordinate frames). Length, thickness and color of coordinate frame triads, when display is enabled, is also controllable by the user.

Figure 10:
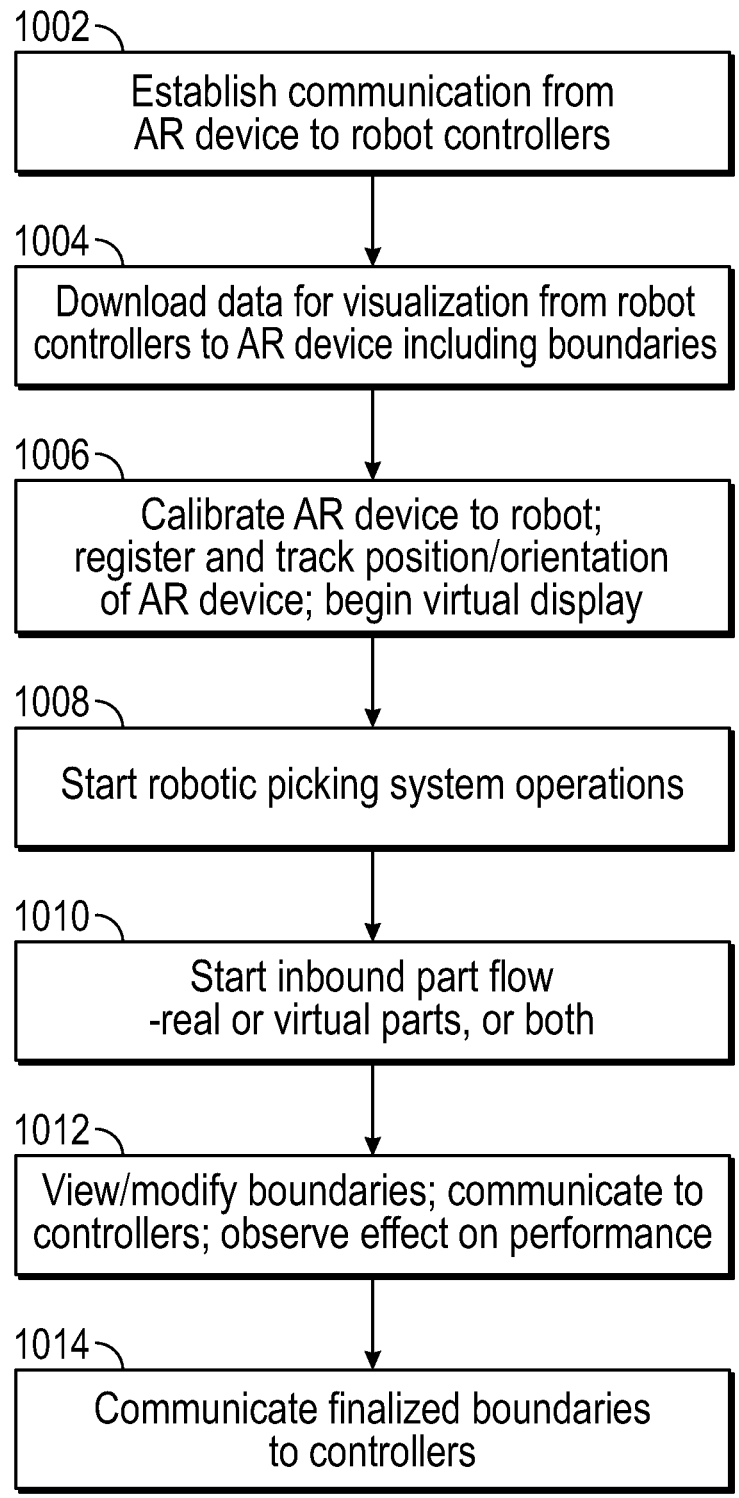
FIG. 10 is a flowchart diagram of a method for augmented reality configuration of a visual tracking robotic picking system, according to an embodiment of the present disclosure.

FIG. 10 is a flowchart diagram 1000 of a method for augmented reality configuration of a visual tracking robotic picking system, according to an embodiment of the present disclosure. At box 1002, the AR device (180 or 182) establishes communication with the robot controller or controllers via wireless communication, as discussed earlier. The robot controllers may communicate with each other and with cameras and pulse coders via a hard-wired or wireless LAN, and the communication with the AR device is preferably wireless. Preliminary boundary positions for each of the robots may already exist in the robot controllers. If any such boundaries exist, they are downloaded from the robot controllers or a non-AR robotic picking system configuration program to the AR device at box 1004. If no pre-existing operational zones are available, the user can proceed with the process to create, modify and visualize the boundaries in the AR visualization application.

At box 1006, the AR device is calibrated to the robot(s). The position and orientation of the AR device are registered with the "world frame" which is a fixed coordinate system in the work cell of the robotic picking system. Registering the AR device to the work cell coordinate frame is performed by pointing the camera in the AR device at one or more visual markers so that a plurality of images of the markers are captured by the AR device. After the position and orientation of the AR device are registered with the work cell coordinate frame, inertial and visual odometry are used by the AR visualization application to continuously track the position and orientation of the AR device relative to the work cell coordinate frame. In this technique, the processor in the AR device receives signals from accelerometers and gyros onboard the AR device and continuously computes updated position and orientation of the AR device based on integration of the acceleration and yaw rate signals. The position and orientation are checked and corrected based on images from the camera on the device, such as images of the visual markers or other recognizable items which exist at a known location. Display of all virtual items is computed to match camera images of real-world items based on the AR device position and orientation. Also at the box 1006, the AR visualization application begins display of the virtual boundaries for the robotic picking system.

At box 1008, operation of the robotic picking system is started, including motion of the inbound conveyor and outbound conveyor (or placement of outbound packaging containers). At box 1010, part flow is started to the inbound conveyor. Parts introduced at the box 1010 may include real parts, virtual parts, or both. One or more part models may be included. Virtual parts may be introduced at a part flow rate and part position/orientation distribution selected by the AR visualization application user. When real and/or virtual parts are introduced at the box 1010, the AR visualization application identifies the parts with virtual part boxes, identification flags or both, and the robotic picking system begins picking the parts from the inbound conveyor and placing the parts on the outbound conveyor or packaging. With operation of the robotic picking system started at the box 1008, the robot controller(s) communicate each part allocation and pick/place operation in real time to the AR visualization application.

At box 1012, the user modifies the boundaries of the robot pick/place zones as desired, the modified boundaries are communicated to the robot controllers, and the user observes the effect on robotic picking system performance. A typical objective is to achieve a desired part flow rate with zero missed parts and a fairly equal balance of parts handled by each robot in the robotic picking system. During the interactions and iterations at the box 1012, the user modifies boundaries using gesture or other commands, views the operation of the robotic picking system from any desired point of view by walking about the work cell, and evaluates performance parameters displayed in the AR visualization application. When the user modifies a boundary location in the AR visualization application, the modified location is communicated to the corresponding robot controller and used by the controller to compute its robot's picking/placing operations. As the user is observing the AR scene, the robots are actually moving—picking and placing real parts, and simulating the picking and placement of virtual parts, based on real-time calculations by their respective controllers using boundaries as modified in the AR visualization application.

Throughout the robotic picking system operation and the AR visualization application simulation, it is to be understood that the communication and data flow between the AR device and the robot controllers is two-way in nature. When the user moves a boundary in the AR visualization application, the AR device immediately communicates modified boundary locations to the robot controllers for use in computing robot pick and place operations. This is a key attribute of the AR visualization application—that boundaries can be visualized by the user, modified, and the effect of the modified boundary location is instantly and directly observable in the real-time performance of the robotic picking system. At the same time, the robot controllers communicate every part allocation (selection by a robot) and pick and place operation, identified with the individual part, to the AR device in real time. This allows the AR device to update the AR display to show part status changes, show part movements when picked, and compute performance statistics including missed parts and parts handed by each robot.

At box 1014, when robotic picking system boundary visualization and modification is complete and the user is satisfied with system performance, the finalized boundaries are uploaded to the robot controllers and confirmed/committed for production operations. During production operations, the finalized boundaries are used by the robot controllers to compute pick/place operations in real time.

Throughout the preceding discussion, various controllers are described and implied—for controlling motions and tasks of a robot, for running the AR visualization application on the AR device, etc. It is to be understood that the software applications and modules of these controllers are executed on one or more computing devices having a processor and a memory module, including algorithms configured in non-volatile memory. In particular, this includes processors in the robot controllers 112/122/132 and the AR devices 180/182 and AR controller 184 discussed above. The communication between the robots, their controllers and the mobile device may be over a hard-wire network, or may use any suitable wireless technology—such as a cellular phone/data network, Wi-Fi, Bluetooth, broadband Internet, etc.

As outlined above, the disclosed techniques for augmented reality visualization for a robotic picking system offer several advantages over prior art techniques. The ability of a user to easily and intuitively adjust robot pick and place boundaries, introduce virtual parts and view system performance in real time is far superior to prior techniques.

While a number of exemplary aspects and embodiments of the method and system for augmented reality visualization for a robotic picking system have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for configuration of a visual tracking robotic picking system using augmented reality, said system comprising:
   one or more robots in a work cell, each robot having a robot controller in communication with the robot, said controller including a processor and memory and being configured with robot control software for controlling operation of the robot; and
   an augmented reality (AR) device operated and positioned by a user and in communication with the one or more robot controllers, said AR device having one or more cameras, position tracking sensors and a display, said AR device further including a processor and memory configured to run a robotic picking system visualization AR software application;
   where the robotic picking system visualization AR software application provides features including;
   providing preliminary boundaries for each of the one or more robots, said boundaries confining robot pick and place operational space;
   establishing and continuously tracking a position and orientation of the AR device relative to a work cell coordinate frame;
   providing an AR display of the boundaries and other virtual items superimposed on camera images of real items in the work cell;
   instructing the one or more robot controllers to simulate a conveyor-based flow of virtual parts for processing by the robotic picking system, where virtual parts, real parts or both may be processed by the robotic picking system;
   receiving boundary location modifications from the user using the AR device;
   communicating the boundary location modifications to the one or more robot controllers;
   receiving part allocation and part pick and place information from the robot controllers; and
   displaying picking system performance parameters in the AR display.

2. The system according to claim 1 wherein the AR device is a headset apparatus worn by the user, or a mobile device held by the user.

3. The system according to claim 1 further comprising a pulse coder device configured to track a position of each conveyor in the robotic picking system, and a camera or other sensor configured to detect a presence and a position and orientation of the real parts on each conveyor.

4. The system according to claim 1 wherein providing preliminary boundaries for each of the one or more robots includes downloading the preliminary boundaries from a separate robotic picking system set-up application or establishing the preliminary boundaries at default locations within the robotic picking system visualization AR software application.

5. The system according to claim 1 wherein establishing the position and orientation of the AR device relative to the work cell coordinate frame includes analyzing images of one or more visual marker having a known design and placed at a known location in the work cell coordinate frame.

6. The system according to claim 1 wherein the position tracking sensors include one or more gyroscopes and one or more accelerometers, where the position tracking sensors provide signals to the processor in the AR device enabling continuous computation of changes in position and orientation of the AR device.

7. The system according to claim 1 wherein providing an AR display includes displaying the boundaries and the other virtual items in a proper size, shape and position relative to the camera images of the real items as the AR device is moved around the work cell.

8. The system according to claim 1 wherein the other virtual items include the virtual parts, part identifier blocks on the real parts, part information flags on real parts and virtual parts, coordinate frame triads, and camera position and field of view, and the display of the other virtual items is continuously updated based on the part allocation and part pick and place information received from the robot controllers.

9. The system according to claim 1 wherein instructing the one or more robot controllers to simulate virtual parts includes selecting, by the user, a virtual part feed rate and statistical distributions for positions and orientations of the virtual parts fed to the robotic picking system on an inbound conveyor.

10. The system according to claim 1 wherein receiving boundary location modifications from the user includes selecting a boundary to modify, moving the boundary a user-designated distance in an upstream or downstream direction, and accepting the boundary location modification, where selecting a boundary, moving the boundary and accepting the modification are performed by the user via AR-based gestures, menu commands or both.

11. The system according to claim 1 wherein communicating the boundary location modifications to the one or more robot controllers includes using modified locations of the boundaries by the robot controllers in computing robot pick and place operations.

12. The system according to claim 1 wherein displaying picking system performance parameters in the AR display includes displaying performance parameters and diagnostic information about any one or more robot or conveyor which is visible in the AR display at a given time.

13. The system according to claim 1 wherein the performance parameters include conveyor speed, real part rate, virtual part rate, total part rate, number of missed parts, part pick rate per robot, and part pick percentage per robot, and any combination of the performance parameters is displayable as selected by the user.

14. The system according to claim 1 wherein the boundaries include upstream, discard and downstream boundaries for each robot for each conveyor.

15. An apparatus for configuration of a visual tracking robotic picking system, said apparatus comprising an augmented reality (AR) device operated and positioned by a user and in communication with one or more robot controller, said AR device having one or more camera, position tracking sensors and a display, said AR device further including a processor and memory configured to run a robotic picking system visualization software application, where the software application is configured to interoperate with the one or more robot controller in the robotic picking system, instruct the one or more robot controllers to simulate a conveyor-based flow of virtual parts for processing by the robotic picking system, display boundaries and other virtual items in an AR display on the AR device, allow boundary modifications by the user using the AR device and communicate the boundary modifications to the one or more robot controller, and display real-time part movements and picking system performance parameters in the AR display.

16. A method for configuration of a visual tracking robotic picking system using augmented reality, said method comprising:

providing a robotic picking system having one or more robots with a robot controller in communication with each of the one or more robots, providing an augmented reality (AR) device operated and positioned by a user and in communication with the one or more robot controllers, said AR device having one or more cameras, position tracking sensors and a display, said AR device further including a processor and memory configured to run a robotic picking system visualization AR software application;

providing preliminary boundary positions;

calibrating and continuously tracking a position and orientation of the AR device relative to a work cell coordinate frame;

starting operation of the robotic picking system, including starting part flow on an inbound conveyor, where the part flow includes real parts, a flow of virtual parts simulated by the one or more robot controllers, or both;

providing an AR display on the AR device, where the AR display includes boundaries and other virtual items superimposed on camera images of real items in a work cell of the robotic picking system;

modifying the boundary positions by the user of the AR software application on the AR device;

communicating the boundary positions from the AR software application to the one or more robot controllers;

communicating part allocation and part pick and place information from the robot controllers to the AR software application in real time; and displaying picking system performance parameters in the AR display.

17. The method according to claim 16 wherein the other virtual items include the virtual parts, part identifier blocks on the real parts, part information flags on real parts and virtual parts, and coordinate frame triads, and the display of the other virtual items is continuously updated based on the part allocation and part pick and place information received from the robot controllers.

18. The method according to claim 16 wherein the virtual parts simulated by the one or more robot controllers are based on parameters provided by the AR software application including user-defined values for a virtual part feed rate and statistical distributions for positions and orientations of the virtual parts on the inbound conveyor.

19. The method according to claim 16 wherein modifying the boundary positions by a user includes selecting a boundary to modify by the user, moving the boundary a user-designated distance in an upstream or downstream direction, and accepting the boundary location modification by the user, where selecting a boundary, moving the boundary and accepting the modification are performed by the user via AR-based gestures, menu commands or both.

20. The method according to claim 16 wherein communicating the boundary positions to the one or more robot controllers includes using modified locations of the boundaries by the robot controllers in computing robot pick and place operations.

21. The method according to claim 16 wherein displaying picking system performance parameters in the AR display includes displaying performance parameters and diagnostic information about any one or more robot or conveyor which is visible in the AR display at a given time.

22. The method according to claim 16 wherein the performance parameters include inbound conveyor speed, real part rate, virtual part rate, total part rate, number of missed parts, part pick rate per robot, and part pick percentage per robot, and any combination of the performance parameters is displayable in the AR display as selected by the user.

23. The method according to claim 16 wherein the robotic picking system includes the inbound conveyor carrying parts to be picked by the one or more robots and either an outbound conveyor or a stationary package for receiving parts placed by the one or more robots, and the boundaries include upstream, discard and downstream boundaries for each robot for each conveyor.

* * * * *